Patented Apr. 12, 1927.

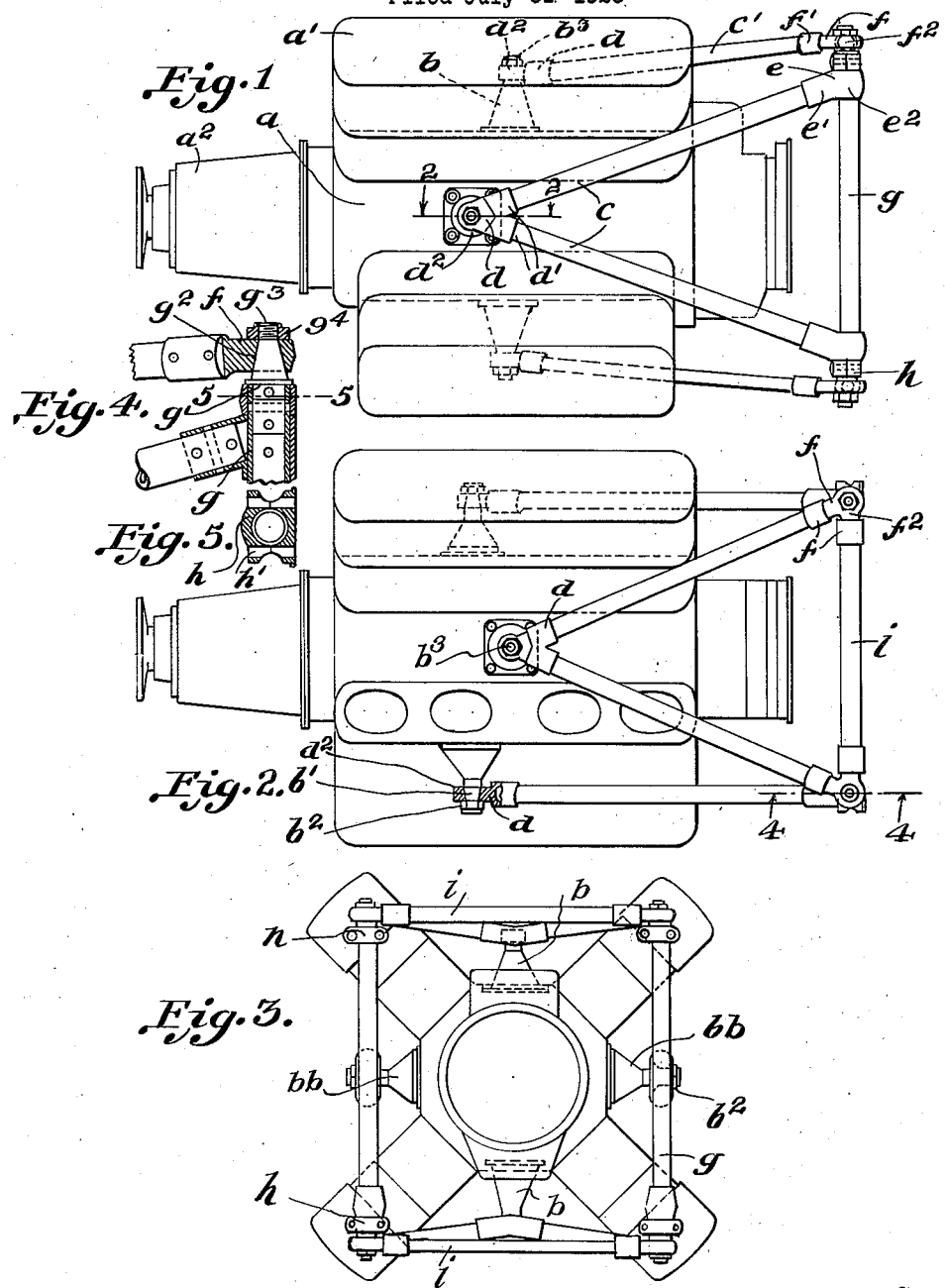

1,624,761

UNITED STATES PATENT OFFICE.

FREDERICK HENRY ROYCE AND ALBERT GEORGE ELLIOTT, OF WEST WITTERING, NEAR CHICHESTER, ENGLAND, ASSIGNORS TO ROLLS-ROYCE LIMITED, OF DERBY, ENGLAND.

MEANS FOR SUPPORT OF AERO ENGINES.

Application filed July 31, 1926, Serial No. 126,284, and in Great Britain August 8, 1925.

This invention is an improved means of supporting aero engines on the face of the nacelle of the aeroplane or other part of the frame provided for the purpose.

The invention is specially useful in cases where the engine contains four rows of cylinders in cruciform.

According to this invention the crank case is provided with oppositely placed trunnions which are held at the apices of cantilever brackets projected from the face of the nacelle or part of the frame aforesaid, for example, there may be four cantilever brackets one on each side of, one above, and one below the engine, or there may be two, one on each side of the engine, and means to locate the engine torsionally about such trunnions such as a tubular or like projection from the back of the engine secured to the nacelle or frame, or a like cantilever bracket at the top or at the bottom of the engine.

In the accompanying drawing an example, or both top and bottom of our invention is illustrated, in which there is a cantilever bracket on each side of the engine and one on the top.

Fig. 1 is a side elevation, Fig. 2 a plan view with one block of cylinders omitted, and certain parts of the suspension in section on line 2—2 of Fig. 1. Fig. 3 a rear end elevation, Fig. 4 an enlarged section on line 4—4 of Fig. 2, and Fig. 5 a section on line 5—5 of Fig. 4 of one of the feet or brackets which secure the structure to the aeroplane framework.

$a$ is the crank case, $a^1$ are the cylinder castings and $a^2$ the propeller shaft housing, $b$ and $bb$ are brackets or trunnions bolted to the crankshaft case, and as to $b$ at points on an axis running practically through the centre of gravity of the engine, having tapered portions $b^1$ and threaded ends provided with nuts $b^2$. $c$ and $c^1$ are steel tubes, $d$ are forgings with sockets $d^1$ into which the ends of tubes $c$ and $c^1$ are inserted, and into which they are brazed and pegged and with a portion $d^2$ with a tapered perforation therethrough corresponding to the tapered portion $b^1$ of the brackets $b$ and $bb$. The tapered portions of the trunnions are inserted in the tapered perforations of the forgings $d$ and secured by the nuts $b^3$. $e$ are forgings with sockets $e^1$ into which the other ends of tubes $c$ are inserted and in which they are brazed and pegged, and with a portion $e^2$ which is perforated. $f$ are forgings with sockets $f^1$ into which the tubes $c^1$ are inserted and in which they are brazed and pegged with a portion $f^2$ perforated with a tapered hole. $g$ are steel tubes having pieces $g^1$ brazed and pegged into their ends with a tapered portion $g^2$ and threaded ends $g^3$. These tubes pass through the perforations in the forgings $e$ in which they are brazed, and the tapered portions $g^2$ of the end pieces $g^1$ engage the holes in the forgings $f$ and are secured therein by nuts $g^4$. $h$ are split clips encircling the tubes $g$ between the forgings $e$ and $f$ with holes $h^1$ therethrough to receive bolts for securing the apparatus to the aeroplane structure. $i$ is a steel tube, each end thereof inserted in a socket of forging $f$ into which it is brazed and pegged.

What we claim is:—

1. In an aeroplane means for supporting the engine on the face of the nacelle comprising cantilever triangular brackets projected from the nacelle and trunnions projected from the sides of the engines and secured to the apices of such brackets.

2. In an aeroplane means for supporting the engine on the face of the nacelle comprising two cantilever triangular brackets projected from the nacelle in vertical planes, one on each side of the engine, trunnions projected from the engine secured to the apices of such brackets and means for locating the engine about such trunnions.

3. In an aeroplane means for supporting the engine on the face of the nacelle comprising two cantilever brackets projected from the nacelle in vertical planes one on each side of the engine, trunnions projected from the sides of the engine and secured to the apices of such brackets and a tubular member secured to the top of the engine and to the frame of the aeroplane.

4. In an aeroplane means for supporting the engine on the nacelle comprising two cantilever brackets projected from the nacelle in vertical planes one on each side of the engine, trunnions projected from the sides of the engine secured to the apices of such brackets, a cantilever bracket projected from the nacelle in a horizontal or approximately horizontal plane on the top of the engine and a trunnion projected from the top of the engine and secured to the apex of such lever.

5. In an aeroplane means for supporting the engine on the nacelle comprising two cantilever brackets projected from the nacelle in vertcal planes one on each side of the engine, trunnions projected from the sides of the engine and secured to the apices of such brackets, a cantilever bracket projected from the nacelle in a horizontal or approximately horizontal plane under the engine, and a trunnion projected from the under side of the engine and secured to the apex of the said bracket.

6. In an aeroplane means for supporting the engine on the nacelle comprising two cantilever brackets projected from the nacelle in vertical planes one on each side of the engine, trunnions projected from the engine and secured to the apices of such brackets, a cantilever bracket projected from the nacelle in a horizontal plane on the top of the engine a trunnion projected from the engine and secured to the apex of such bracket, a cantilever bracket projected from the nacelle in a horizontal or approximately horizontal plane underneath the engine and a trunnion projected from the engine and secured to the apex of such bracket.

In witness whereof we have signed this specification.

FREDERICK HENRY ROYCE.
ALBERT GEORGE ELLIOTT.